(12) United States Patent
Haynes

(10) Patent No.: US 10,000,148 B1
(45) Date of Patent: Jun. 19, 2018

(54) STRAP WINDING APPARATUS AND METHOD

(71) Applicant: Mike Haynes, St. George, UT (US)

(72) Inventor: Mike Haynes, St. George, UT (US)

( * ) Notice: Subject to any disclaimer, the term of this patent is extended or adjusted under 35 U.S.C. 154(b) by 0 days. days.

(21) Appl. No.: 15/680,438

(22) Filed: Aug. 18, 2017

(51) Int. Cl.
  *B66D 1/04* (2006.01)
  *B60P 7/08* (2006.01)
  *B65H 75/44* (2006.01)

(52) U.S. Cl.
  CPC ........ *B60P 7/0846* (2013.01); *B65H 75/4494* (2013.01)

(58) Field of Classification Search
  CPC ... B66D 1/04; B66D 1/06; B66D 1/30; B66D 1/34; B66D 2700/0116; B60P 7/0823; B60P 7/083; B60P 7/0846; B60P 7/0853
  See application file for complete search history.

(56) References Cited

U.S. PATENT DOCUMENTS

| 7,017,847 | B2 | 3/2006 | Treat |
| 7,861,382 | B1 | 1/2011 | Madachy et al. |
| 8,370,997 | B2 | 2/2013 | Wright |
| 2007/0122247 | A1 | 5/2007 | Madachy et al. |

*Primary Examiner* — Emmanuel M Marcelo
(74) *Attorney, Agent, or Firm* — M. Reid Russell

(57) ABSTRACT

A strap winding apparatus consisting of three separate components that are formed in individual molds from a material that will exhibit some elasticity when joining the components together, which components include a crank, drum and U-shaped frame, where the crank includes a straight body with a handle extending outwardly from one end, and with the other body end formed with a pivot for fitting into a drum end that includes a longitudinal slot with a crossing round hole that the crank body pivot end is fitted into to provide a pivot coupling that allows the handle to pivot around the drum end, and the drum opposite end is arranged for fitting through aligned holes formed through first and second sides of the U-shaped frame forming a pivot coupling in the second side hole that allows for turning of the crank to wind a cargo strap onto the drum, and includes a wedge and/or a flat section of a double backed adhesive for mounting a web of the U-shaped frame onto a mounting plate of a cargo strap tightener or onto a cargo strap.

13 Claims, 10 Drawing Sheets

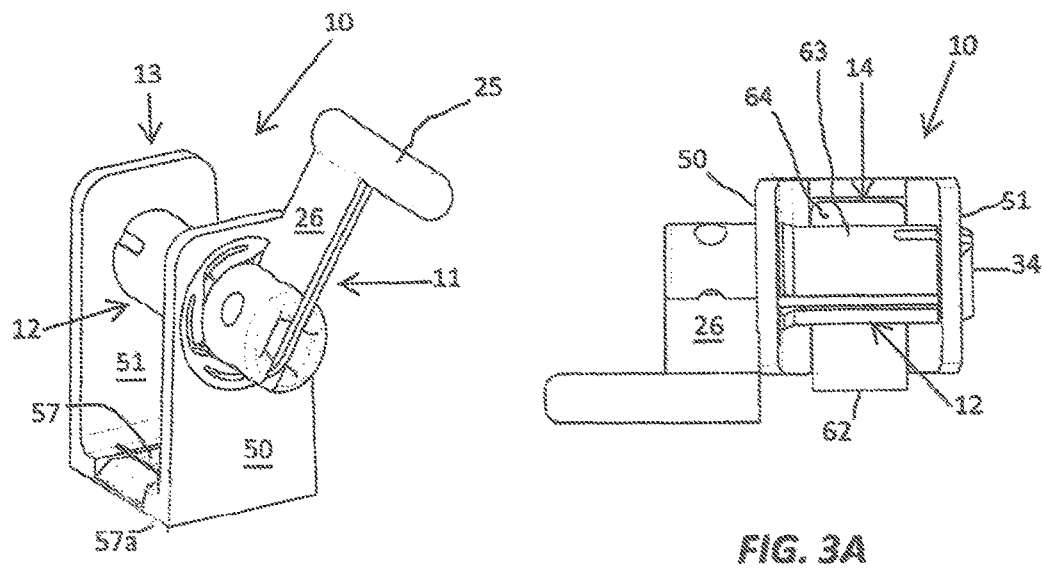
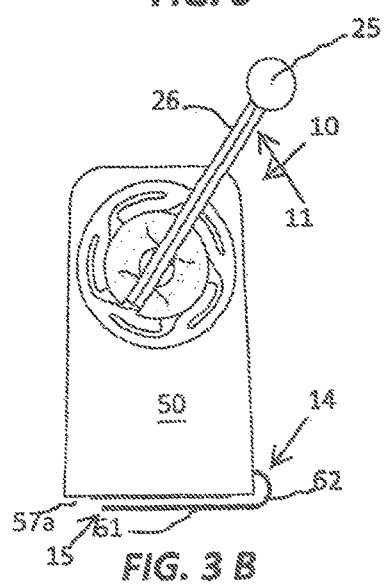
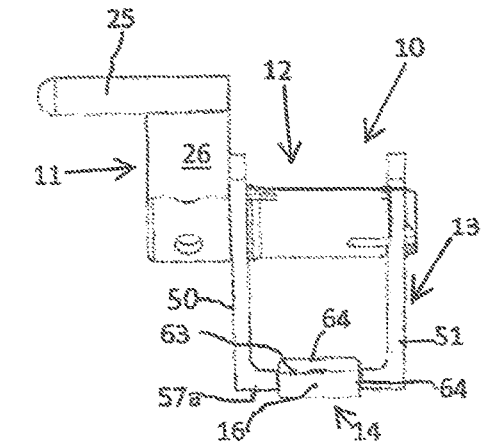
FIG. 3
FIG. 3A
FIG. 3B
FIG. 3C

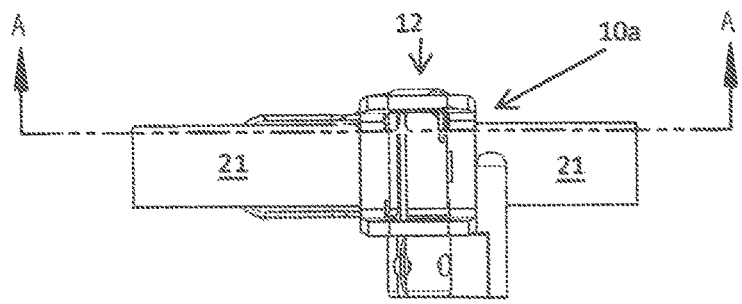
FIG. 9
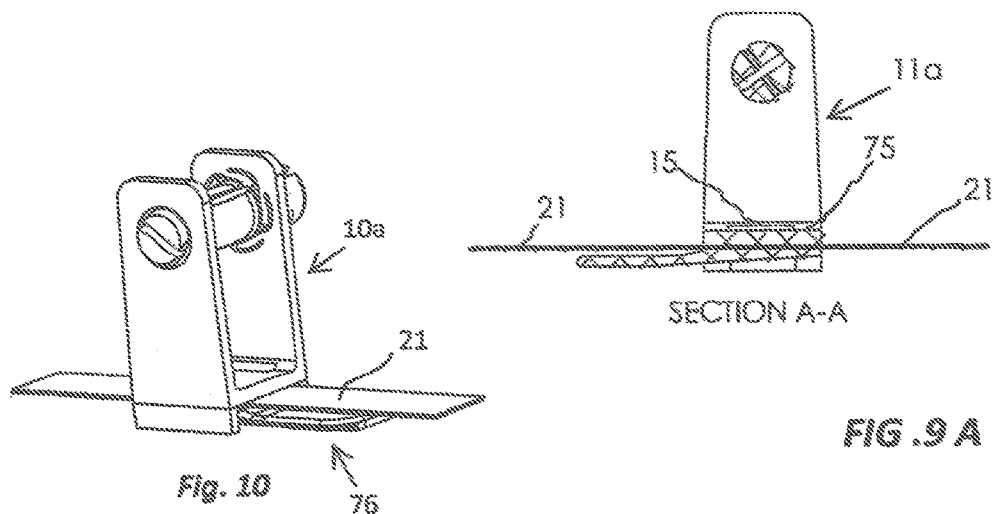
FIG. 9A
Fig. 10
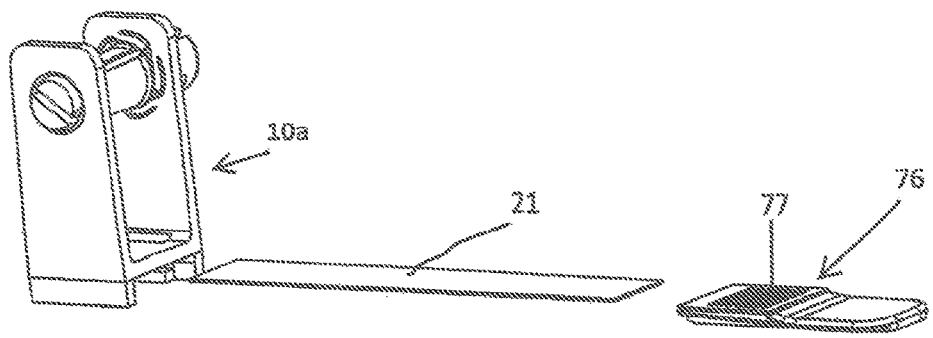
FIG. 10A

STRAP WINDING APPARATUS AND METHOD

BACKGROUND OF THE INVENTION

Field of the Invention

A strap winding apparatus for conveniently taking up, storing, managing and organizing as an accessory for cargo straps.

Prior Art

The invention is in a cargo strap winding apparatus that includes a crank operated drum to take up a cargo strap.

Like the strap winding apparatus of the invention, earlier cargo strap tighteners have included drum that is slotted to receive a strap end fitted there through such that, when the drum is turned, the strap will be rolled up on the drum.

Unlike the invention such earlier arrangements have not provided a simple and reliable drum locking arrangement that is integral to the drum and drum crank where the crank can be pivoted from a drum turning attitude to where the crank handle will engage the side of a drum U-shaped frame, locking the drum in place. Prior to the present invention, such drum locking was provided by a separate locking pin arrangement for fitting into the drum to block turning, or with a ratchet arrangement or even by a tying of the loose strap end around the strap after it is stretched across a load.

Unique to the invention, the components of the strap winding apparatus are formed as separate components by molding or casting methods, from, preferably from a glass filled nylon or an ABS plastic material to be assembled together for installation into the finished device for convenient mounting to a strap ratchet device to both pull the strap through the ratchet device and wind the strap on the drum where the components of the strap winding apparatus of the invention are individually formed for fitting together into a unit where the drum is journaled to turn in the U-shaped frame and the drum crank can be pivoted across the drum end to where the crank handle end extends outwardly from the side of the U-shaped frame to allow an operator to turn crank to turn the drum and provides a pivot coupling of the crank to the drum that allows the crank handle to be pivoted to cross the side of the U-shaped frame whereby, with the strap wound onto the drum, the crank is pivoted to where the crank handle engages the side edge of the U-shaped frame, preventing drum turning.

SUMMARY OF THE INVENTION

It is a principal object of the present invention to provide a strap winding apparatus that is formed from three sections that are coupled together such that a crank can pivot around its end coupling to a drum and the crank handle end can pivot between an outwardly extended attitude for gripping by an operator to an in pointing attitude where the crank handle will engage a side edge of a U-shaped frame that the drum is journaled across to turn freely so as to roll up a free end of cargo strap that has been pulled through a cargo strap tightener.

Another object of the present invention is to provide crank and drum sections as separate section that are for coupling together, with the crank shaft end to fit into a drum end such that the crank can pivot around the drum end such that a handle end of the crank can extend outwardly from opposite sides of the drum end, extending, in a first position, away from a side wall of the of the U-shaped frame to allow an operator to grip the handle end to turn the drum, and in a second position the crank handle extends across the U-shaped frame side wall to turn again an edge of which side wall, prohibiting turning of the drum, as a drum lock.

Another object of the present invention is to provide a spring arrangement formed around a hole formed in U-shaped frame side wall that receives the drum end fitted therethrough, and which spring arrangement engages the drum sides, biasing the drum outer surface adjacent to the crank inwardly, allowing sections of the drum end to spread apart when the crank is pivoted and urging which drum end sections to spread apart after the crank shaft handle has pivoted between is pivoted between its first and second positions.

Still another object of the present invention is to provide the drum with a center slot that is open from a first end to a closed other second end that an end the crank opposite to the crank handle end is fitted into, and which crank handle end includes aligned ball sections ball extending outwardly from both side of the crank handle end that will fit into a round slot formed across the drum first end at a right angle to drum center slot whereby, with the drum fitted through aligned holes formed through the U-shaped frame sides, and the crank handle is fitted through the hole formed through the U-shaped frame side that includes the spring arrangement, the crank handle can be pivoted from the first to second position by turning the crank such that the ball sections turn across the sides of the round slot, spreading the drum end at the center slot against the spring biasing in the U-shaped frame hole, turning the crank from the first to the second position across the drum end, whereat the ball sections again seat in the round slot allowing the spring biasing to relax, holding the crank handle in the first of section position.

Still another object of the present invention is to provide for pivot mounting of the drum end opposite to the drum end that mounts the crank in the U-shaped frame side opening away from the opening formed with the spring arrangement.

Still another object of the present invention is to provide for mounting the base of the U-shaped frame onto the top of the cargo strap tightener.

The strap winding apparatus is for connection to a cargo strap tightener that is for use with a ratchet strap drawing arrangement that the cargo strap is pulled through and held in a stretched attitude over a load maintained on a truck or trailer bed. Which connection can be with a locking wedge or a use of an adhesive strip, or both, within the scope of the invention.

The strap winding apparatus is formed by a connection together of three individual components, a crank, drum and frame that are separately formed by casting methods from an appropriate material, such as a glass filled nylon or ABS plastic, where the finished components will be somewhat flexible to accommodate their slight bending when being fitted together.

The crank is formed to have a handle end that is fixed to, and extends at a right angle outwardly from, a straight crank body that has uniform parallel sides and includes a pivot formed as rounded sections that align and extend outwardly from opposite sides of the body as equal length short cylinders. The drum is formed to receive the pivot end of the crank body on a first end thereof and is slotted longitudinally from the first end to terminate at a second end of the crank body, and which longitudinal slot includes a crossing round track formed across the crank body, adjacent to the first end, that is to receive the crank body pivot end therein, and the drum second end includes a frame mounting slot formed thereacross that crosses the drum longitudinal slot and is to allow the ends of the second drum end to be pressed together such that a ridge formed around the drum second end can be fitted into a frame second hole to pass into and expand into a continuous slot formed around the frame second end hole, with the ridge and slot forming a pivot coupling between the drum and frame.

The frame, additional to the second hole, includes a spring arrangement formed in sections around the wall of the second hole that include spring segments that bias the longitudinal slot sides towards one another when the drum is installed therein. Which spring segments each include a flexing leaf that together bias the drum slot sides towards one another. So arranged, with the crank fitted into the drum first end to pivot the crank handle across drum first end, an operator turns the crank handle to turn the crank body in the crossing slot, urging the slot sides apart against the biasing of the spring segments flexing leaves and moving the crank handle across the frame second sides, from a position pointing away from the frame side, extending outwardly therefrom as a handle for gripping by an operator to turn the drum, to an attitude above the drum to where the handle will engage the frame second side edge to prohibit back turning of the drum, acting as a drum lock.

In practice, the frame web can be maintained onto the surface of the cargo strap tightener with a double back adhesive tape. Additionally, or alternatively, a wedge can be fitted across the edge of the cargo strap tightener and frame web that can include a releasable lock therewith.

DESCRIPTION OF THE DRAWINGS

In the drawings that illustrate that which is presently regarded as the best mode for carrying out the invention:

FIG. 3 is a sided elevation view of the strap winding apparatus as set up in FIG. 2 taken from the first side of the U-shaped frame showing the crank handle as having been turned across an edge of the U-shaped frame first side;

FIG. 3A is a top plan view of the strap winding apparatus of FIG. 3;

FIG. 3B is a side elevation view like that of FIG. 3 only showing the crank handle taken from the U-shaped frame first side;

FIG. 3C is an end elevation view of the strap winding apparatus of FIG. 3;

FIG. 3F is an end elevation view of the strap winding apparatus of FIG. 3D,

FIG. 9 is a top plan view of the strap winding apparatus of FIG. 3 that further includes parallel legs that extend at right angles downwardly from the U-shaped frame base, showing the strap winding apparatus positioned on a cargo strap and shows a wedge positioned under the base that includes a binding surface for connection onto the strap surface;

FIG. 9A is an end sectional view taken along the line A-A showing a side elevation view of the U-shaped frame of FIG. 6 second side that is adjacent to the crank handle and shows the drum end as including a slot on the end thereof that crossed the center longitudinal slot that extends from the drum first end and shows the wedge positioned under the strap, urging the strap against the U-shaped frame base undersurface;

FIG. 10 shows the U-shaped frame base with legs extending downwardly from along the edges thereof positioned beneath the cargo strap with a coupling wedge shown positioned under the base and cargo strap;

FIG. 10A shows a perspective exploded view of the frame base with legs of FIG. 10 aligned to receive the cargo strap and shows the wedge aligned to fit under the strap and frame base;

FIG. 11 A shows a top plan view of the strap winding apparatus, strap and cargo strap tightener of FIG. 11;

DETAILED DESCRIPTION

Figure 1:
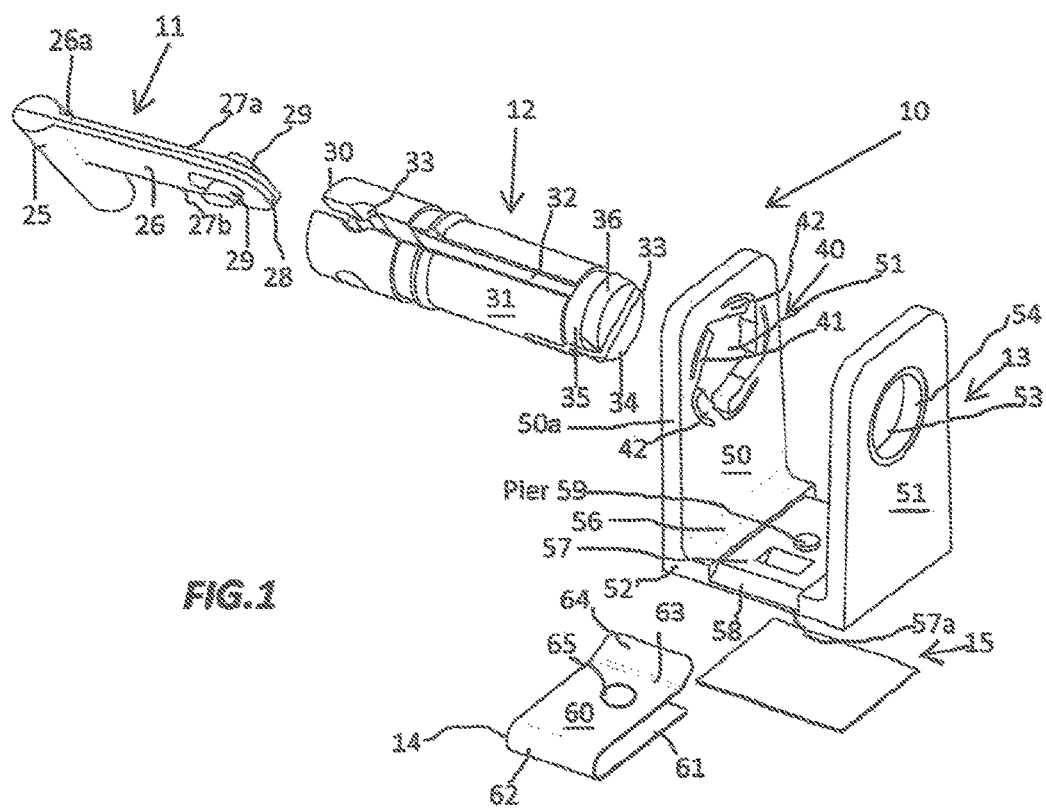
FIG. 1 is a side elevation perspective view of the strap winding apparatus of the invention shown exploded apart, with the components thereof, the crank drum and U-shaped frame shown aligned for fitting together and shows both a section of a double backed adhesive and wedge arrangement aligned for mounting onto the U-shaped frame web to couple it to a strap winding apparatus, as shown in FIGS. 6 through 11.
Figure 2:
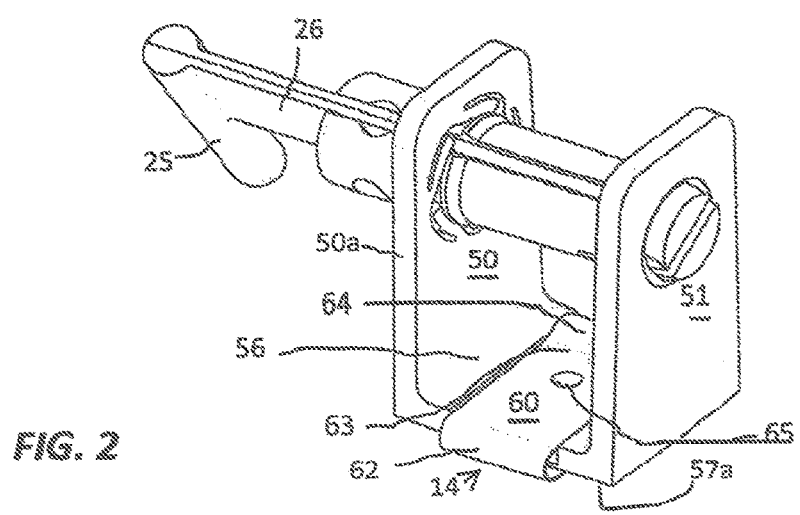
FIG. 2 is a side elevation perspective view of the assembled strap winding apparatus of FIG. 1.
Figure 4:
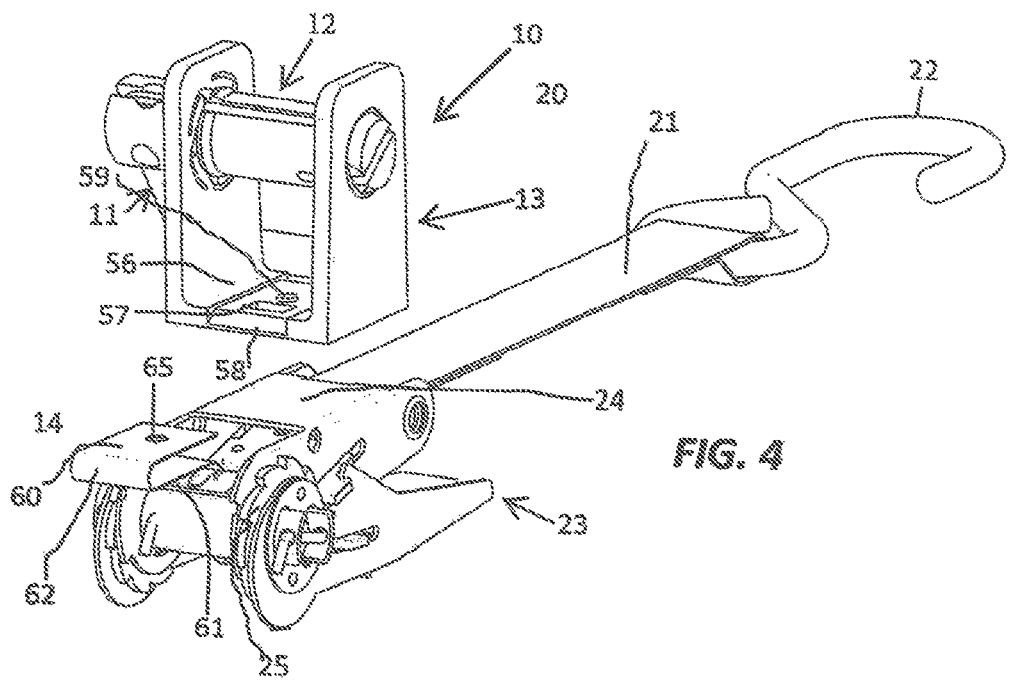
FIG. 4 is a side elevation view of the strap winding apparatus of FIG. 2 that has been pivoted one hundred eighty degrees and is shown aligned for mounting onto a plate of a cargo strap tightener that includes a ratchet arrangement that allows a cargo strap to be drawn therethrough and releasably locks against the strap to prevent strap travel back through the tightener until the lock is released.

FIG. 1 shows the components of a strap winding apparatus 10 as consisting of three separate units, a crank 11, a drum 12 and a U-shaped frame 13, as the primary components of the invention that are shown assembled together in FIG. 2. Additionally, the FIGS. 1 and 2 show a wedge 14 as an additional component that is for releasably fastening the strap winding apparatus 10 to an anchor plate 24 of a cargo strap tightener 23, or the like, as shown in FIG. 4 and discussed below, and further includes a section of a double back adhesive 15, for mounting the strap winding apparatus 10 onto the cargo strap tightener 23, or to a cargo strap 21, as discussed below.

Figure 5:
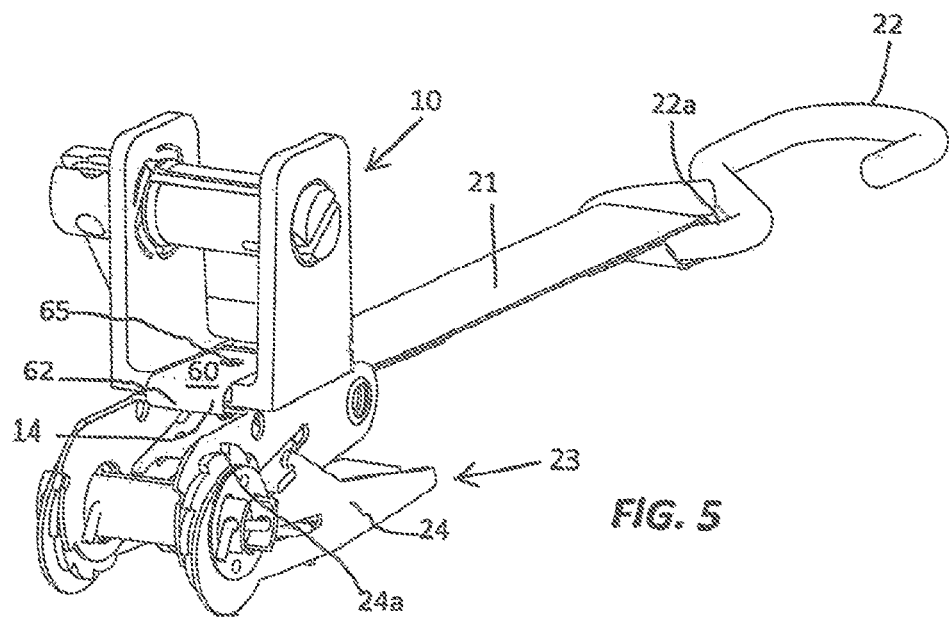
FIG. 5 shows the strap winding apparatus of FIG. 4 mounted onto the cargo strap tightener plate and held thereon by a locking wedge.
Figure 6:
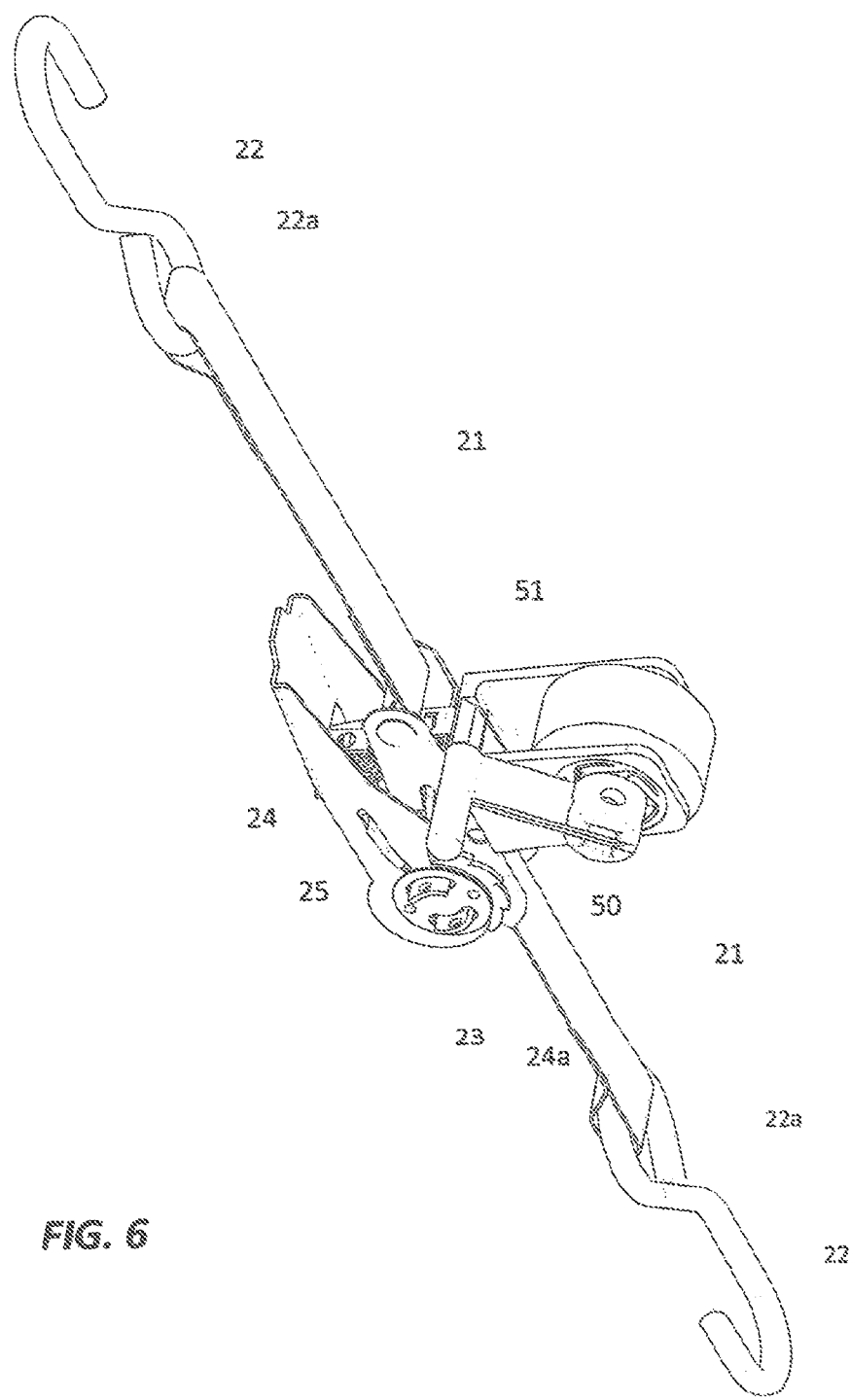
FIG. 6 shows the strap winding apparatus of FIGS. 4 and 5 mounted onto the cargo strap tightener with the crank shown as having been pivoted in the slot of the drum body to where the handle end extends outwardly from the first side of the U-shaped frame.
Figure 7:
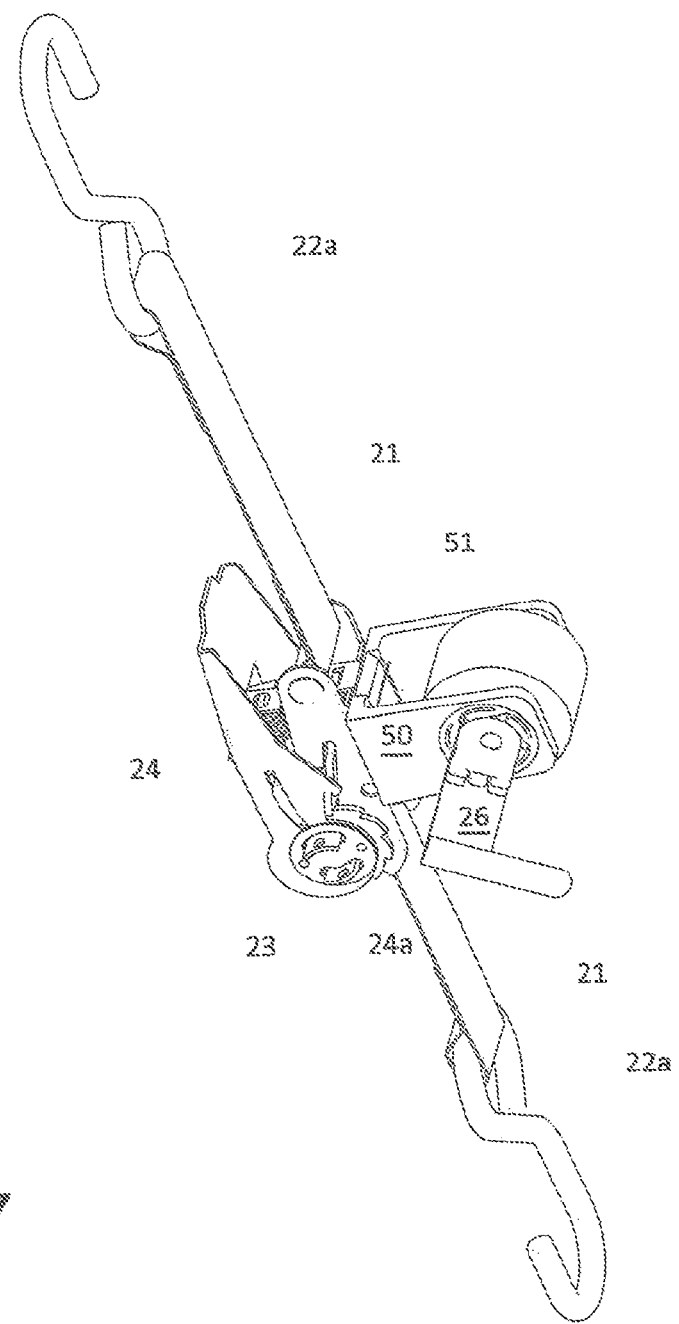
FIG. 7 is a view like that of FIG. 6 only showing the crank as having been pivoted in the drum body slot to where the crank handle is parallel to the U-shaped frame first side.

The strap winding apparatus 10 when connected to a cargo strap tightener 23, as shown in FIGS. 5 through 7, provides a strap 21 drawing arrangement, shown as having a lever 24 operated ratchet arrangement where cargo strap 21 that mount hooks 22, that are attached on ends thereof, to sides of a truck or trailer bed, not shown, is pulled through and held in a stretched attitude over a load maintained on the truck or trailer bed, not shown. Which connection can be with the wedge 14, or can include of the double backed adhesive section 15, or both can be utilized for mounting to the cargo strap tightener or to the strap 21, as set out below, within the scope of the invention.

The strap winding apparatus 10 is formed by a connection together of three individual components, the crank 11, drum 12 and frame 13, that are formed separately, preferably by casting methods from an appropriate resilient material, such as a glass filled nylon or ABS plastic, where the finished components will be somewhat flexible to accommodate some bending when they are being fitted together, as set out below.

Shown best in FIGS. 1 through 3G and 6 through 8, the crank 11 is formed to have a handle 25 end that is fixed to, and extends at a right angle outwardly from, a straight crank body 26 first end 26a, and has uniform parallel sides 27a and 27b and a rounded second end 28 that is opposite to the handle 25 end of the first end 26a. A pivot 29 is formed as a pair of identical rounded flat cylindrical sections that align and extend outwardly from, and are adjacent to, which crank body rounded second end 28, that align and extend outwardly from opposite sides of the body 26, adjacent to the rounded second end 28.

The drum 12, to fit to the crank body 26, is formed to receive the pivot 29 end of the crank body 26 at a drum first end 30 that includes a body 31 with a longitudinal slot 31 formed therein that extends from the drum first end 30 and terminates back from a second end 34 of the crank body. Which longitudinal slot 32 includes a crossing round slot 33 formed across the drum first end 30 that is to receive the crank body pivot 29 end fitted therein and is to provide for pivoting of the crank 11 around the drum 12 first end 30, between crank handle 25 first and second positions, as shown in FIGS. 1 through 3G.

Figure 3D:
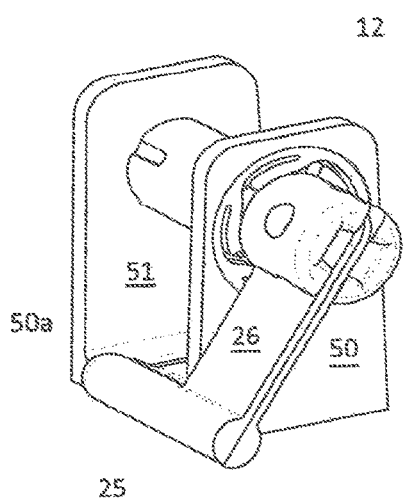
FIG. 3D is a side elevation view of the strap winding apparatus of FIG. 3 except the crank is shown as having been pivoted to where the handle thereof engages the edge of the first side of the U-shaped frame.
Figure 3E:
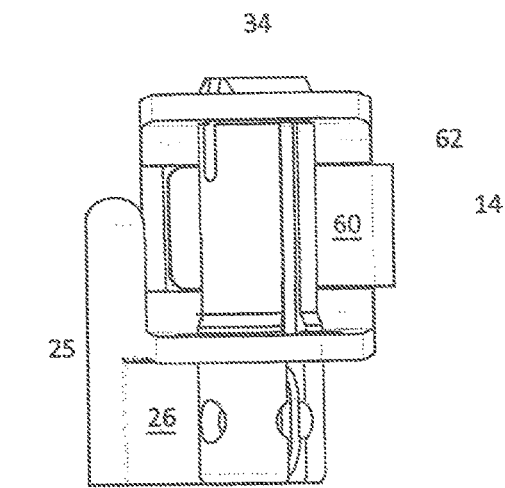
FIG. 3E is a top plan view of the strap winding apparatus of FIG. 3D.
Figure 3F:
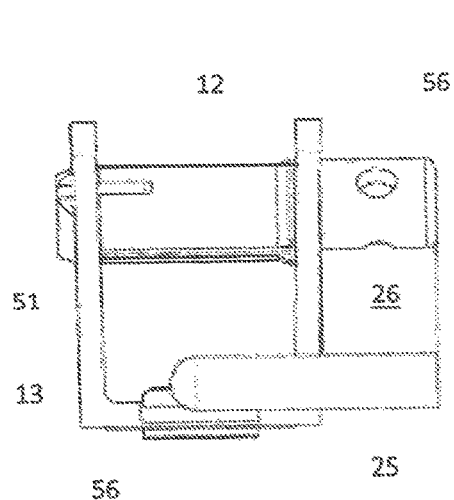
FIG. 3F is an end elevation view of the strap winding apparatus of FIG. 3E taken from the first side of the U-shaped frame.

FIG. 6 shows a first crank 11 handle 25 in its first position where the handle 25 extends at a right angle outwardly from the drum 12. In which position, as shown in FIGS. 3 through 3C and 6 the handle 25 is for gripping by an operator to turn the crank 11 and attached drum 12. Whereas, when the handle 25 is in a second position, as shown in FIGS. 3D through 3G and 8, the handle 25 crosses an edge 51a of the U-shaped frame 13 second side 51, functioning as a drum lock, prohibiting backward rotation of the drum 12 as would loosen the tension on the strap 21.

For installing the crank 11 to have a pivot coupling in the drum 12 first end 30, as set out above, the crank 11 end 28 is fitted into the drum end 30 to where the crank pivots 29 travel into a round slot 33 that crosses the longitudinal slot 32, and the crank 11 is pivoted to where the pivots and in which round slot 32, allowing the drum sides 31 to relax together.

With the crank 11 fitted into the drum 12 first end 30, the assembly is ready to be installed into the U-shaped frame 13. To provide which fitting, the drum 12 second end 34 includes a frame mounting longitudinal slot 33 formed in the drum 31 that crosses the drum longitudinal slot 32 in the drum second end 34 that is to allow the sides of the drum 12 second end 34 to be pressed together such that a groove 35 formed around the drum 12 second end 32 can be fitted into a frame second side 51 second hole 53 and pass into to expand into a continuous ridge 54 formed around the U-shaped frame 13 second hole 53. Which drum slot 35 and frame second side 51 ridge 54 form a pivot coupling between the drum 11 and U-shaped frame 13 side 51, as shown in the assembled view of FIG. 2. Also, to facilitate the pivot coupling of the crank 11 and drum 12, the drum second end 34 is preferably sloped at taper 36, as shown in FIG. 1, whereby, by forcing the drum second end 34 into the U-shaped frame 13 second side 51 hole 53, the drum 12 taper 35 will pass across the edge of the second hole 53 and guide the crank 11 end 34 into the U-shaped frame 13 hole 53 so as to provide for moving the sides of the drum 11 second end 33 together until a groove 35 of the drum 11 second end 34 aligns with and enters into the second hole 51 ridge 54, forming a pivot coupling between the drum 11 and the U-shaped frame 13 second hole 53.

The U-shaped frame 13, additional to the second side 51 and hole 53 includes, in its side 50, a hole 56 that includes a spring 40 arrangement formed as spring segments 41 that are positioned at equal intervals around the wall of the hole 56. Which spring segments 41 bias drum 12 body 31 sections across the longitudinal slot 32 towards one another when the drum 12 is installed through the U-shaped frame side 50 hole 52. Which spring segments 41 each include a flexing leaf 42 that will compress when the crank 11 is pivoted between the attitudes shown in FIGS. 6 through 8. So arranged, when the crank pivot 29 is turned in the drum round slot 33, the drum sections across the longitudinal slot 32 are spread apart when the crank pivots climb the sides of the round slot, causing the spring segments 41 to be depressed until the pivot 29 sections seat back in the drum slot 33. Whereat, the spring segments 41 bias the sides of the drum sections along the longitudinal slot 32 towards one another, maintaining the crank in the attitudes shown in either FIG. 6 or 8.

Figure 8:
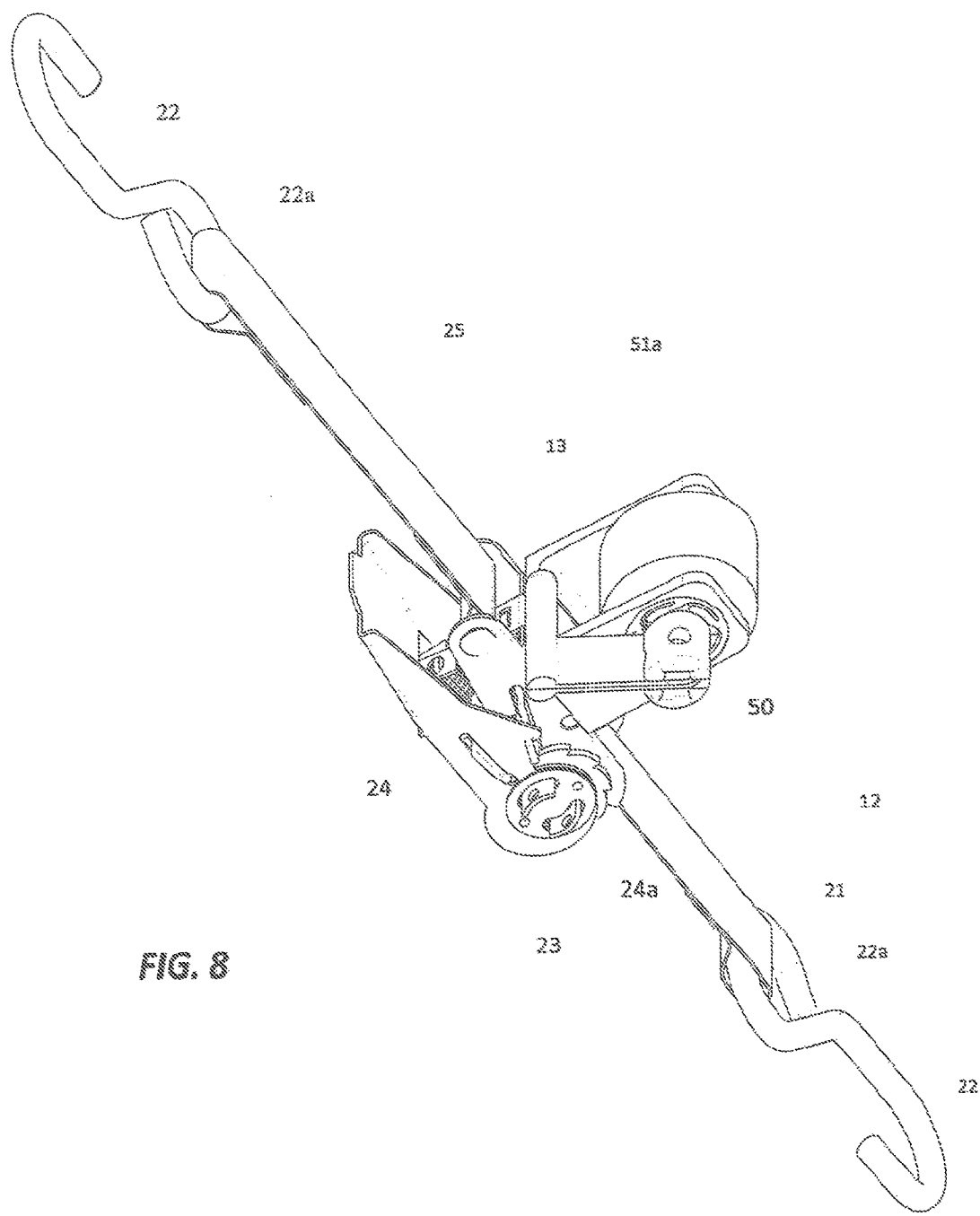
FIG. 8 is a view like that of FIGS. 6 and 7 only showing the crank as having been pivoted in the drum body slot to where, when the drum is appropriately turned, the handle will engage the edge of the first side of the U-shaped frame, locking the drum in position.

So arranged, with the crank 11 fitted into the drum 12 first end 30, to pivot the crank 11 to where crank handle 25 either extends outwardly from the end of the drum 12, as shown in FIG. 6, or is pivoted in the drum 12 first end 30 to be parallel to and above the drum 12, as shown in FIG. 8, an operator pivots the crank 11 handle 25 around an aligned attitude to the drum 12, as shown in FIG. 7. Which crank 11 handle 25 pivoting takes place when the drum 12 pivots 29 climb the round slot 33 until the drum pivot segments 29 fit back into the round slot 33, as shown in FIG. 7, closing the drum section across the longitudinal slot to close. With pivoting of the crank 11 provided for by turning the pivot segments across the round slot 33, that pivoting is against the biasing of the spring segments 41, with the leaves 42 to flex inwardly as the drum 12 longitudinal slot 33 is spread apart against the biasing of the spring segments 41. With, when the crank 11 handle 25 is in either of the positions of FIGS. 6 and 8, the spring segments 41 flexing leaves 42 will have relaxed urging the drum 12 sections along longitudinal slot 33 to close back towards one another, maintaining the drum sections together such the crank handle 25 extends away from the U-shaped frame side wall 50, or extends inwardly across the edge 50a of the U-shaped frame side wall 50, to lock the drum 11 against a back rotation.

So arranged, with the crank 11 handle 25 positioned away from the U-shaped frame first side 50 the crank 11 handle 25 is gripped by an operator to turn the drum 11. Whereas, with the crank 11 handle 25 positioned, as shown in FIG. 8, over the drum 11, the handle 25 will turn into the edge 50a of the U-shaped frame first side 50, the tension in the strap 21 as has been created by the rolling up of the strap 21 around the drum, will pull the handle 25 to engage the U-shaped frame 13 edge 50a, providing a lock that precludes further back travel of the strap 21 off of the drum 11.

As shown in FIGS. 1 and 2, as well as in FIGS. 3 through 8, the U-shaped frame 13 includes the first and second sides 50 and 51 that are alike and each extends at right angles upwardly, in parallel relationship to one another, and at right angles to parallel edges of a U-shaped frame 13 frame web 56, between bottom ends of which sides 50 and 51. The first and second sides 50 and 51 each have aligned holes 52 and 53 formed therethrough, with first side 50 having a first hole 52 and the second side 51 having a second hole 53, and with the first hole 52 shown as including the spring segments 41 formed at intervals around the hole 52 edge, and each spring segment 41 includes the flexing leaf 42, to function as described above. The second side 51 hole 53, shown in FIG. 1, includes the ridge 54 that receives the drum second end 34 fitted therein to where drum first end slot 35 fits into the second hole 53 ridge 54, forming a pivoting coupling of the crank 11 through the U-shaped frame 13 allows for a free rotation of the drum 11 to wind the strap 21, whose end is fitted into the drum 12 longitudinal slot 32 onto the drum 11.

Shown in FIGS. 1 and 4, and in the assembled view of FIGS. 2 and 5, the strap winding apparatus 10 is arranged for mounting onto a cargo strap tightener 23 utilizing a wedge 14 that is formed from a rectangular section of a metal that is bent across a center line 62 forming wedge top and bottom sections 60 and 61 respectively. To facilitate fitting of the wedge 14 onto the web 56 of the U-shaped frame 13 to mounting the wedge 14 onto a plate 24 of the cargo strap tightener 23, as shown in FIG. 4, the wedge 14 top section 60 is bent upwardly at bend 63 a short distance back from its forward end forming an upturned lip 64 that will fit across the end 58 of a center section of the U-shaped frame web 56. So arranged, to attach the strap winding apparatus 10 to the cargo strap tightener 23, the wedge 14 is pushed by an operator to move the lip 64 across the U-shaped frame web 56 sloped edge 58 and adjacent edge of the bottom section 61 with the wedge 14 top and bottom sections 60 and 61 to travel across the web 56 and under the cargo strap tightener 23, as shown in FIG. 4, to where a wedge center hole 65 that is formed through the wedge top section 60 will have traveled over a wedge locking pier 59 formed on the top surface of the U-shaped frame 13 web 56. So arranged, when the wedge center hole 65 aligns with the pier 59 the wedge top section 60 will move downwardly such that the pier 59 travels into the wedge hole 65, locking the U-shaped frame 13 onto the cargo strap tightener 23 mounting plate 24.

As an additional or collateral mounting arrangement for mounting the strap winding apparatus 10 onto the cargo strap tightener 23, or a strap 21 surface, the undersurface of the U-shaped frame 13 web 56 includes, as shown in FIG. 1, a section of a double back adhesive 15 that is adhesively connected to the web 56 undersurface by removing a first cover sheet therefrom and pressing the first adhesive surface thereof against the undersurface of the web 56. Whereafter, by a removal of a second cover sheet from the opposite double back adhesive section 15, the second adhesive surface is exposed and can be pressed against the cargo strap tightener 23 mounting plate 24, or, where a cargo strap tighter 23 is not mounted to the strap winding apparatus 10, as shown and discussed below, the second adhesive surface can be pressed directly onto the cargo belt 21 to mount it thereon, as set out above.

FIGS. 3 through 3C show, respectively, profile perspective, top elevation side elevation and frontal views the of strap winding device 10 taken from the first side 50 of the U-shaped frame 13, and are included to show different views of the assembled strap winding device showing the assembled relationship of the crank 11, drum 12, U-shaped frame 13 and, as shown in FIGS. 3B and 3C, the wedge 14. Where, and shown in FIGS. 3 through 3C, the crank 11 is shown in a first position with the handle 25 extending outwardly from the U-shaped Frame 13 first side 50 for gripping by an operator to turn the crank 11 and connected drum 12. Whereas, in FIGS. 3D through 3G, the handle 25 is shown as having been pivoted to its second position where it has been pivoted one hundred eighty degrees around the drum end 30 to extend across the side 50a of the U-shaped frame first side 50 such that, when, after an operator releases the handle 25, with the strap 21 wound around the drum 12, the tension exerted by the stretched strap 21 will pivot the drum back, turning the handle 25 into engagement with the edge 50a of the U-shaped frame 13 first side 50, locking the drum 11 in place against further backward turning.

Figure 3G:
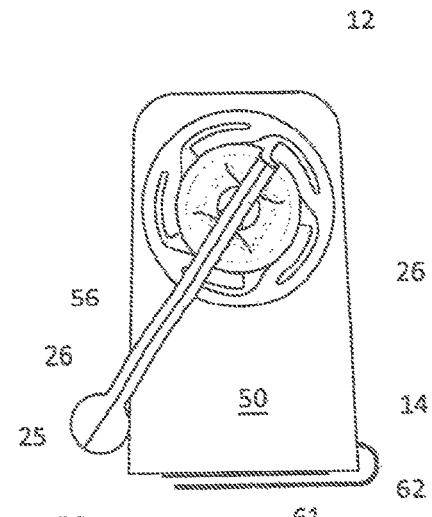
FIG. 3G is a side elevation view of the strap winding apparatus of FIG. 3C, taken from a the first side of the U-shaped frame.

Additionally, as shown in FIGS. 3 through 3G, the strap winding apparatus 10 includes the wedge 14 for mounting the apparatus 10 onto a mounting plate 24 of the cargo strap tightener 23 as shown in FIG. 4. The wedge 14, to provide a positive locking of the apparatus 10 onto the plate 24, is formed from a spring material, such as steel, and, as shown, is a rectangular section that is fold in approximately half along a bend 62 forming top and bottom sections 60 and 61 with the top section shown best in FIG. 1, as having an upturned lip forward end 64 formed by a bend 63 across the top section 60. Which upturned lip 64 will engage a U-shaped frame web 57 sloped end 58 and slide upwardly thereon onto a flat center section 57 of the U-shaped frame 13 web 56 such that, when an operator pushes on the wedge 14 bend 62 to urge the wedge 14 top section 60 against and up the web slope 58 expanding the wedge and passing the web bottom section 61 that travels along the web 57 undersurface 57a to where a hole 65 formed along the longitudinal center of the wedge 14 top section 60 passes over and aligns with a pier 59 that projects upwardly from the web 14 center section 57. Whereat, the top section 60 hole 65 will pass along the pier 59 to lock the wedge 14 to the U-shaped frame 13 web 56. Also, as shown in FIGS. 3B and 3G, the double backed adhesive 15 that is applied to the bottom surface 57a of the web 56 preferably remains attached to the web undersurface 57a and is sandwiched between the wedge bottom 61 and U-shaped frame web 56 bottom surface 57a.

With the strap winding device 10 installed to the mounting plate of the cargo strap tightener 23, when the strap 21 is wound onto the drum 12 from hook end 22a, as shown in FIG. 6 through 8, the cargo strap tightener 23 ratchet arm 24, is first lifted to allow passage of the strap therethrough and, when tension is taken off of the strap 21, the ratchet mechanism 25 thereof relaxes, allowing the ratchet wheel 24a to engage a bar, not shown, to lock the strap in place until the ratchet arm 24 is pivoted appropriately. Which cargo strap tightener 23 can be used with the invention and is prior art. FIG. 9 shows a top plan view of a strap winding device 10a that is slightly different from the strap winding device 10 in that, where the first and second sides 50 and 51 of the U-shaped frame 13 connect, at their bottom ends, and align with the, web 56 bottom surface 57a. Whereas, as shown in FIGS. 9A, 10 and 10A, the U-shaped frame 13 first and second sides 50 and 51 of the strap winding device 10a extend, at equal distances, downwardly from the edges of the web 56 bottom surface, forming legs 50a and 51a, providing a space under the bottom surface 57a of the web 56. So arranged, the legs 50b and 51b provide space between the web 56 bottom surface 57a and surface whereon the strap winding device 10a is positioned. Shown in FIG. 9, the strap winding device 10a is positioned on a section of belt 21, and, in the sectional view taken along the line A-A in FIG. 9A, is shown as including adhesive gripping surface 75 fitted to the undersurface of the double backed adhesive section 15 that grips the top surface of the strap 21. Also, as shown also in FIG. 9A, the arrangement includes an elongate wedge 76 that is for fitting under the belt and includes an adhesive surface 77, as shown in FIGS. 10 and 10A, that is for gripping the undersurface of the strap 21 maintaining the strap winding device 10a to the belt 21 as an operator turns the drum handle 25 to wind the strap 21 onto the drum 12. In which operation, the strap 21 passes through the hook 22 eyelet end 22a before it is drawn onto the drum 12 by the turning of the crank 25. In which strap winding operation, it should be understood, the strap can be pulled through either of the strap hooks 22 eyelets 22a dependant upon the positioning of the strap winding device 10a on the strap 21.

Figure 11:
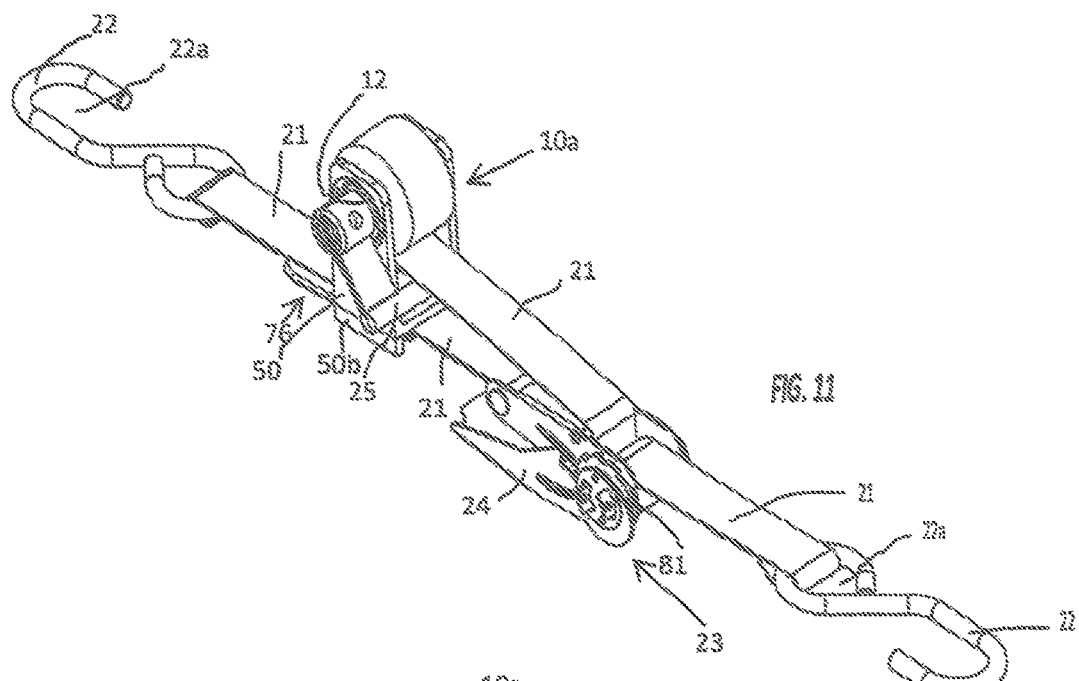
FIG. 11 shows the strap winding apparatus of FIGS. 9 through 9A mounted onto a strap that includes hook ends having bases that are pivotally mounted to each of the strap ends and shows a strap end as having been fitted through a cargo strap tightener that is shown as included a ratchet component that, until release, will not allow a back travel of the strap and shows the strap take up end as having been fitted through the strap winding apparatus drum and rolled up thereon.
Figure 11A:
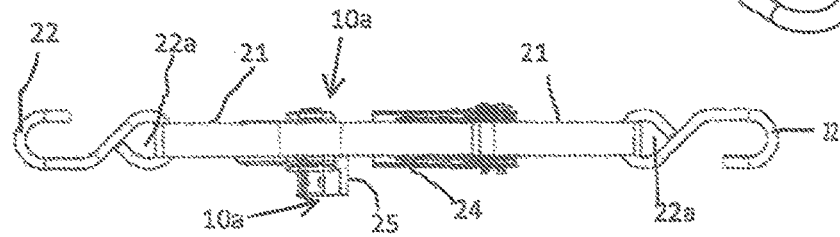
FIG. 11B shows a side elevation view of the strap winding apparatus, strap and cargo strap tightener of FIGS. 11 and 11A.
Figure 11B:
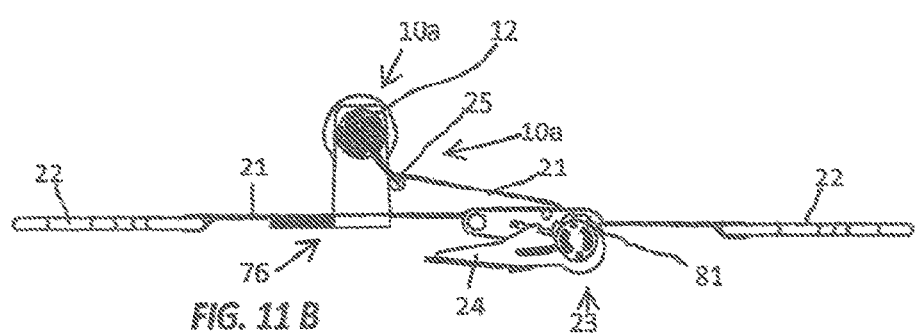
Figure 12:
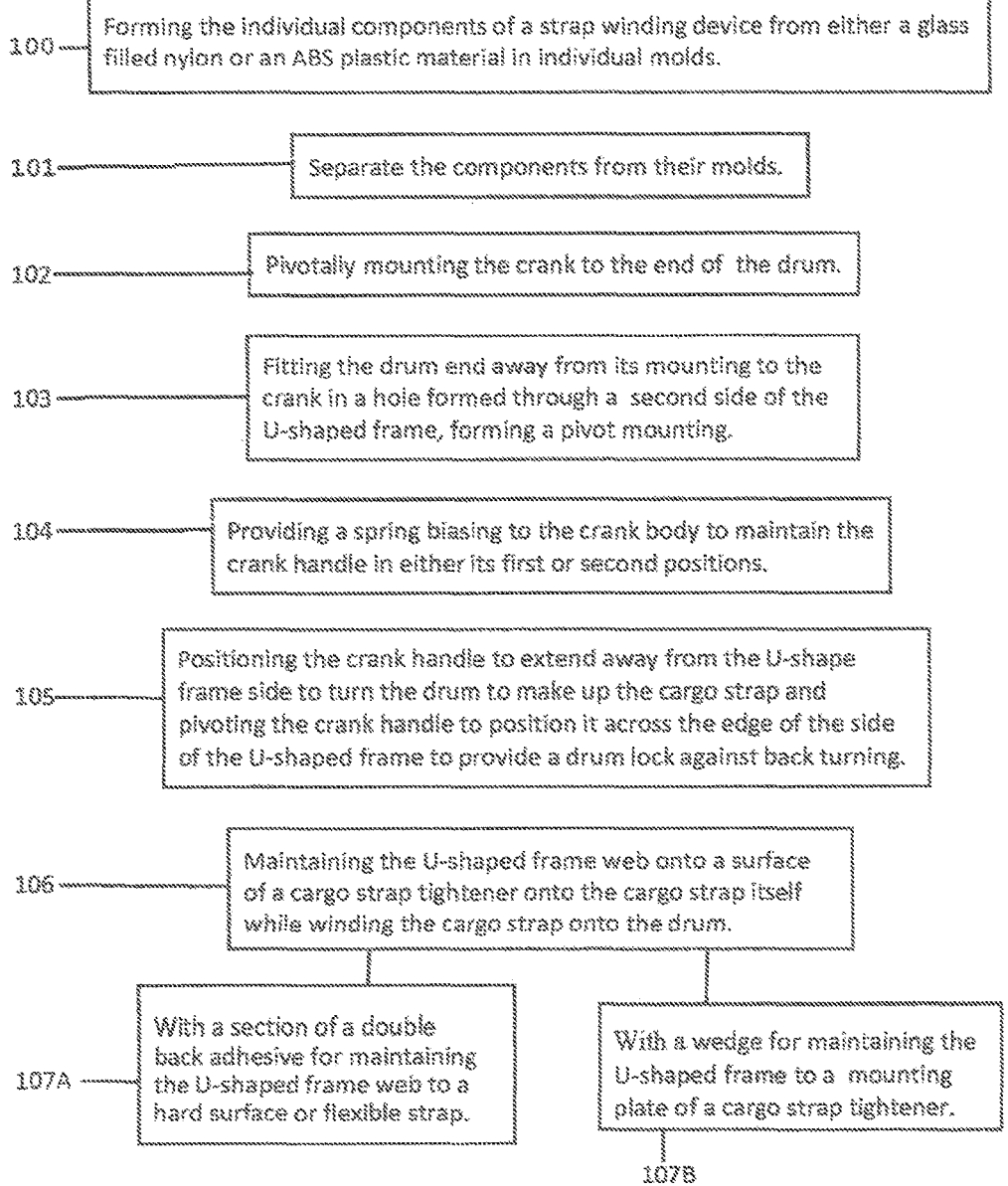
FIG. 12 shows a block flow diagram of the steps for forming and assembling the strap winding apparatus.

FIGS. 11, 11A and 11B show the strap winding device 10a of FIGS. 9 through 10A, and, additionally includes the cargo strap tightener 23 of FIGS. 6 through 8. Which cargo strap tightener 23 however is not shown in FIGS. 11, 11A and 11B as attached to the attachment plate 24 as shown in FIGS. 6 through 8. Rather, the cargo strap tightener 23 is shown in FIGS. 11, 11A and 11B, as unconnected to the strap 21 allowing it to move along the strap 21 as the strap is wound onto the drum 12 by turning of the handle 25, with, it should be understood, the ratchet handle operated to let the strap 12 move through the cargo strap tightener, until a desired strap tightness is achieved. Whereat, the handle 80 is moved to the locking position, as shown in FIGS. 11, 11a and 11B, and the strap winding apparatus 10a handle 25 is pivoted to where the handle is over the drum 12. Whereat, when the handle is released and allowed to back turn into the edge 50a of the U-shaped frame 13 first side 50, as shown in FIGS. 11, 11A and 11B.

The above shows slightly different embodiments 10 and 10a of the strap winding apparatus that demonstrate the versatility of the invention to provide for drum 12 winding and locking to both tighten the strap 21 and to lock it in place when a desired strap tension is achieved, and shows different utilizations of the strap winding apparatus with a cargo strap tightener 23 and attached to the strap 21 itself demonstrating its utility.

The strap winding apparatus 10 and strap apparatus 10a of the invention, as set out in step 100 are formed as three individual components, a crank 11, drum 12 and frame 13 that are separately formed in separate molds by casting methods from an appropriate material, such as a glass filled nylon or an ABS plastic, where the finished components will be somewhat flexible to accommodate their being fitted together. Accordingly, the first step in a practice of the method of manufacture of the strap winding apparatus 100 is to form the individual components of the strap winding apparatus 10, the crank 11, drum 12 and U-shaped frame 13 in individual molds and to then, as step 101, separate which components from their molds.

A next step 102 is for an operator to hold a handle end 25 of the straight crank body 31 that has uniform parallel sides, and includes a pivot formed with like piers 29 that extend outwardly as equal length short cylinders from proximate to the crank body end 28 from opposite sides of the crank body 27 that the operator fits into the drum 12 end first end 30 that is longitudinally slotted at 32 from its first end 30 that the crank body pivot end 28 is fitted into, and which drum longitudinal slot 32 includes a crossing round hole 33 formed across the drum body 31, that is to receive the crank body pivots 29 fitted into and turned therein, forming a pivot mounting the crank 11 in the drum 12 first end 30.

A next step 103 is to fit the drum second end 34 through a first hole 52 formed through a first side 50 of the U-shaped frame 13 and sliding the drum 13 across the U-shaped frame and fitting the drum second end 34 into a second hole 53 formed through the U-shaped frame second side 51 to pass a slot 35 formed around the drum body 31 second end 34 over a ridge 54 formed around the circumference of the U-shaped frame second hole 53, forming a pivot coupling of the drum end 34 in the U-shaped frame second hole 53.

A further step 104 calls for providing a spring biasing of spring segments 40 formed around the drum first end 52, around its circumference, to urge the drum body 31 segments across the longitudinal slot 32 towards one another responsive to the crank pivots 29 being pivoted across the round hole 33 to spread the drum body 31 segments apart, and, with the continued crank body 26 pivoting, where the crank body 26 pivots align with the round role 33, the spring biasing of the spring segments 40 to urge the crank 11 body segments along longitudinal slot 32 back towards one another, holding the crank 11 in either of its two positions at one hundred eighty degree intervals from one another.

A step 106 calls for maintaining the U-shaped frame 13 web 56 onto the surface of a cargo strap tightener or the cargo strap itself while winding the cargo strap end onto the drum.

A step 107A sets out a section of a double back adhesive tape 14 for attachment to an undersurface of the U-shaped frame web 56 by removing a first covering sheet from one surface of the tape and pressing it against the undersurface of the U-shaped frame web 56, and, to mount the web 56, with a removal of a second covering sheet of the tape, and by positioning of the strap winding device 10 web 56 over a surface and pressing it thereagainst to mount the web 56 onto that surface.

A step 107B sets out a wedge as a device for attachment of the U-shaped frame web 56 onto an attachment plate 24 of a cargo strap tightener 23 where the wedge 15 is a section of a flexible material that is bent across a center thereof to have upper and lower sections 60 and 61 for fitting over an edge of the U-shaped frame web 56 and an edge of the cargo strap tightener attachment plate 24 where the upper and lower sections 60 and 61 flex to tightly fit against respective upper and lower surfaces of the web 56 and attachment plate 24 to hold the strap winding device onto the cargo strap tightener attachment plate.

Herein above has been shown and described a preferred embodiment of the strap winding apparatus 10 for taking up, storing and organizing a cargo strap 12. It should, however, be understood that the present disclosure is made by way of example only and that variations are possible without departing from the subject matter coming within the scope of the following claims and a reasonable equivalency thereof, which subject matter I regard as my invention.

I claim:

1. A strap winding apparatus comprising, a crank that has a straight body with a handle projecting outwardly from a first end of said crank body and includes a pivot formed to extend outwardly from both sides of said straight body, proximate to a second end of said straight body; a drum formed as a cylinder and has a longitudinal slot formed from a first end of said cylinder that said crank pivot is to be fitted into and has a round hole therein that crosses said longitudinal slot and is adjacent to a first end of said round hole and, to assemble the strap winding apparatus, said round hole crank pivot is passed into said longitudinal slot and into said round hole, forming a pivot coupling such that said crank handle can be pivoted between first and second positions that are one hundred eighty degrees apart with said pivot remaining in said round hole; a U-shaped frame having first and second upright sides that connect, along their bottom edges, to a web and said U-shaped frame sides have aligned first and second holes formed therethrough that said drum is fitted through, and said U-shaped frame first side first end of said round hole includes a plurality of spring segments formed at spaced intervals around a circumference of said first hole that each include a spring means that will urge sections of said drum body formed along a longitudinal groove to close towards one another and said U-shaped frame second side second hole includes a ridge formed around a circumference of said second hole that is to receive a groove formed around a second end of said drum to provide a pivot coupling of said drum second end; and means for mounting said U-shaped frame web onto a surface.

2. The strap winding apparatus as recited in claim 1, wherein the pivot consists of a pair of aligned short cylinders formed on, to extend from, opposite sides of the crank body forming crank body sections and will fit into the round hole formed through the crank body that crosses the crank body longitudinal slot; and the spring means are leaves that compress when said crank body sections across the longitudinal slot are spread apart by a pivoting of the crank pivot across the drum round hole, and said crank body sections will relax and return to their unbiased state when the crank body pivot aligns with said round hole.

3. The strap winding apparatus as recited in claim 1, wherein a second end drum body includes a straight slot from said drum body second end that intersects and forms a cross with the crank body longitudinal slot.

4. The strap winding apparatus as recited in claim 3, wherein the drum body second end that includes a center slot and extends longitudinally into the drum body, forming a cross with the drum body longitudinal slot; and said drum second end is tapered from and greater to lesser diameters to facilitate its fitting into the U-shaped frame second side second hole.

5. The strap winding apparatus as recited in claim 1, wherein the U-shaped frame web includes a wide center groove formed therein that slopes at a rear surface that includes a short center post that extends upwardly from a center line of said wide center groove; and the means for mounting is a wedge formed from a rectangular section of a resilient material to have upper and lower sections that are formed by bending said material across a lateral center of said material, and said upper section includes an upturned lip formed across its forward edge, and which said upper and lower sections are for fitting across, respectively, end edges of said web and a mounting plate of a cargo strap tightener, to travel along said web upper section and under said mounting plate to where a hole formed in said wedge upper section aligns with and slides down along said web upper section short center post to hold said web onto said mounting plate.

6. The strap winding apparatus as recited in claim 1, wherein the U-shaped frame web is secured along its aligned opposite ends said U-shaped frame first and second sides at equal distances upwardly from the bottom edges of said first and second sides, forming like feet.

7. The strap winding apparatus as recited in claim 1, further including a flat section of a double back adhesive sheet for attachment to an under surface of the web by removal of a protective sheet from one adhesive surface of said adhesive sheet and pressing said sheet adhesive surface onto said under surface of said web.

8. The strap winding apparatus as recited in claim 1, wherein the crank, drum and U-shaped frame are formed from a glass filled nylon.

9. The strap winding apparatus as recited in claim 1, wherein the crank, drum and U-shaped frame are formed from an ABS plastic.

10. A method for forming and assembling a strap winding apparatus comprising the steps of, forming a crank, drum and U-shaped frame components of the strap winding device by molding methods; separating said crank, drum and U-shaped frame components from their molds; pivotally mounting an end of said crank to an end of said drum; fitting said drum end away from its mounting to said crank end into holes formed through a first and second sides of said U-shaped frame to pivotally mount said drum end in the hole formed through said second side of the U-shaped frame; pivoting a handle end of said crank in said drum end between first and second positions against the biasing of spring sections formed around the circumference of said U-shaped frame first hole to provide for crank handle positioning in a first position away from a first of said U-shaped frame with, in the second position, said crank handle points over said drum to engage an edge of the first side of said U-shaped frame against said drum back turning.

11. A method as recited in claim 10, further including the step of maintaining a web of the U-shaped frame onto a mounting surface of a cargo strap tightener.

12. A method as recited in claim 10, further including the step of locking the U-shaped frame web onto a mounting surface of a cargo strap tightener with a wedge that is fitted across a top surface of the U-shaped frame web and an undersurface of the mounting surface of the cargo strap tightener.

13. A method as recited in claim 10, further including the step of maintaining a web of the U-shaped frame onto a surface with a section of a double backed adhesive by pressing an adhesive surface of said section of said double backed adhesive onto an undersurface of the U-shaped frame web and pressing an upper adhesive surface of the section of said double backed adhesive onto a surface.

* * * * *